(12) United States Patent
Yuan et al.

(10) Patent No.: US 12,384,371 B2
(45) Date of Patent: Aug. 12, 2025

(54) AUTONOMOUS DRIVING VEHICLE REDUNDANT HOLDING CONTROL TO PREVENT ROLLING

(71) Applicant: Apollo Autonomous Driving USA LLC, Sunnyvale, CA (US)

(72) Inventors: Baoping Yuan, Sunnyvale, CA (US); Yun Zhao, Sunnyvale, CA (US); Yaoming Shen, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 244 days.

(21) Appl. No.: 18/087,617

(22) Filed: Dec. 22, 2022

(65) Prior Publication Data

US 2024/0208505 A1 Jun. 27, 2024

(51) Int. Cl.
| | |
|---|---|
| *B60W 30/18* | (2012.01) |
| *B60W 10/06* | (2006.01) |
| *B60W 10/18* | (2012.01) |
| *B60W 10/184* | (2012.01) |
| *B60W 30/09* | (2012.01) |
| *B60W 30/095* | (2012.01) |
| *B60W 50/14* | (2020.01) |
| *B60W 60/00* | (2020.01) |

(52) U.S. Cl.
CPC ...... *B60W 30/18118* (2013.01); *B60W 10/06* (2013.01); *B60W 10/182* (2013.01); *B60W 10/184* (2013.01); *B60W 30/09* (2013.01); *B60W 30/0953* (2013.01); *B60W 30/0956* (2013.01); *B60W 30/18136* (2013.01); *B60W 50/14* (2013.01); *B60W 60/0015* (2020.02); *B60W 2520/00* (2013.01); *B60W 2552/53* (2020.02); *B60W 2554/20* (2020.02); *B60W 2554/4029* (2020.02); *B60W 2554/80* (2020.02); *B60W 2710/182* (2013.01)

(58) Field of Classification Search
CPC ............................ G06F 3/04847; G06F 3/165
See application file for complete search history.

(56) References Cited

U.S. PATENT DOCUMENTS

| | | | | |
|---|---|---|---|---|
| 2017/0282877 | A1* | 10/2017 | Besier ..................... | B60T 8/885 |
| 2019/0337497 | A1* | 11/2019 | Scheuerell ............... | B60T 8/171 |
| 2022/0170545 | A1* | 6/2022 | Schlegelmilch ........ | F16H 63/486 |
| 2023/0041319 | A1* | 2/2023 | You .................. | G08G 1/096791 |

(Continued)

*Primary Examiner* — Seth A Silverman
(74) *Attorney, Agent, or Firm* — WOMBLE BOND DICKINSON (US) LLP

(57) ABSTRACT

Data is received from a plurality of sensors mounted on an ADV being held to a standstill. A status of the ADV including a rolling speed of the ADV is detected based on the data from the plurality of sensors. One of a primary brake or a secondary brake is activated, in response to detecting the status of the ADV being a first status including the rolling speed being higher than zero and lower than a first predetermined speed threshold. An electronic parking brake is activated, in response to detecting the status of the ADV being a second status including the rolling speed being higher than the first predetermined speed threshold and lower than a second predetermined speed threshold. An engine brake may be used to reduce the crash damage, and a warning message (e.g., Message-4) may be generated.

20 Claims, 12 Drawing Sheets

(56) References Cited

U.S. PATENT DOCUMENTS

| | | | |
|---|---|---|---|
| 2023/0094805 A1* | 3/2023 | Sharma | B60W 50/0098 717/172 |
| 2023/0104377 A1* | 4/2023 | Singh | B62D 49/00 477/92 |

* cited by examiner

AUTONOMOUS DRIVING VEHICLE REDUNDANT HOLDING CONTROL TO PREVENT ROLLING

TECHNICAL FIELD

Embodiments of the present disclosure relate generally to operating autonomous driving vehicles. More particularly, embodiments of the disclosure relate to controlling for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important to control the ADV to avoid accidents. According to the American transaction department, 5% of crash accidents were caused by braking problem. It is difficult to control the braking unit of the ADV to hold the ADV stably, particularly if the ADV is on a gradient. If the ADV starts to roll back or forward, it is challenging to control the ADV to avoid further rolling faster. On the other hands, the occupant or passenger feeling is also a factor of consideration of controlling the ADV if the ADV starts to roll.

Conventionally, if the ADV starts to roll while in standstill status, the control system of the ADV would add more pressure. However, the conventional method has several problems. For example, the command of adding more pressure may not transfer successfully to the braking system due to computing delays or software errors. The braking torque may not be enough to protect vehicle rolling. The braking system's torque may have some issues. The ramp-up rate of brake torque may be too low. Other braking systems may have issues at the same time. Thus, the conventional method cannot hold the ADV effectively. Further, there may be an occupant or passenger comfort issue if the ramp-up rate of brake torque is too high.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
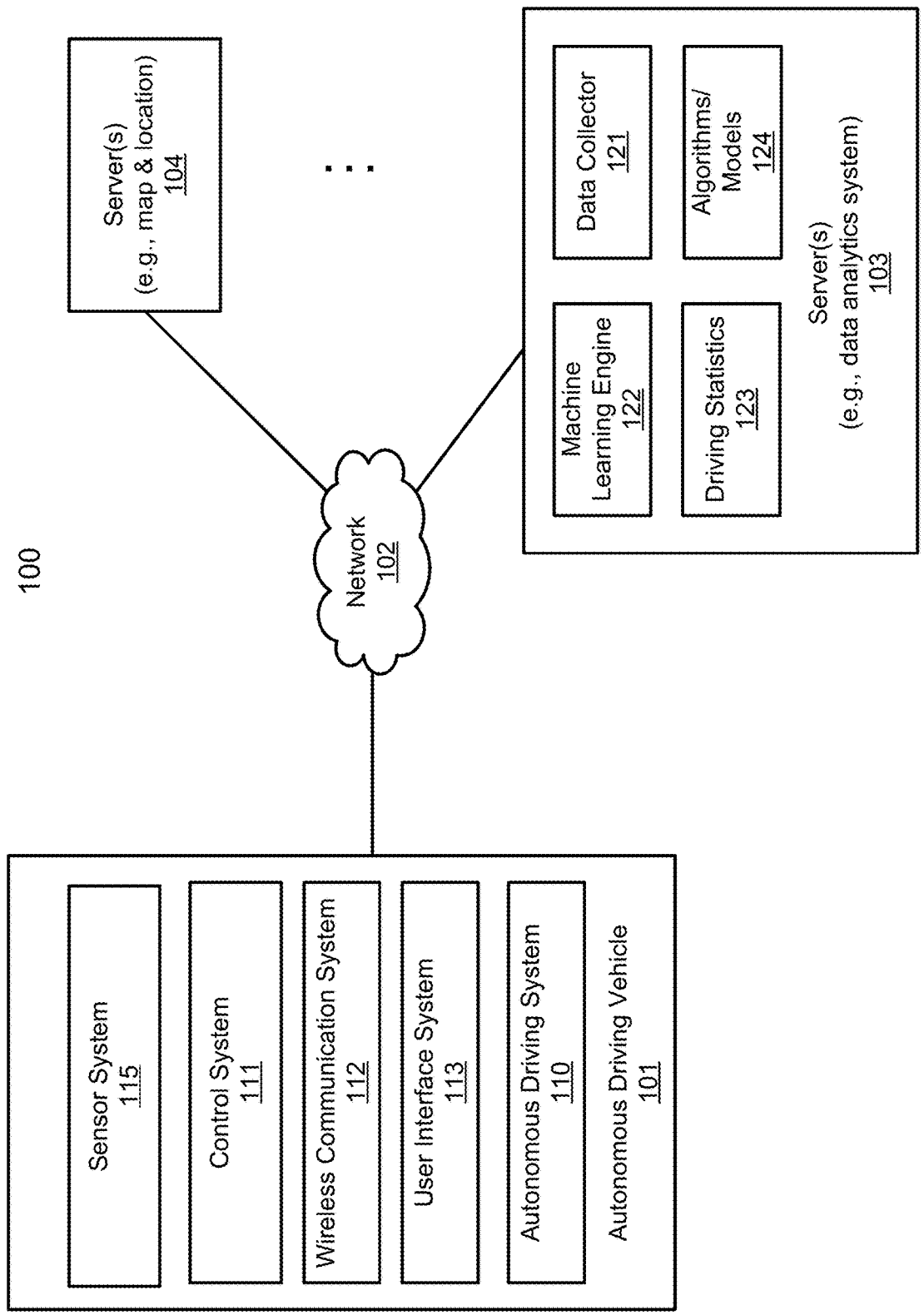
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some aspects, a redundant holding control technique to prevent rolling of an ADV are provided herein. Not only the safety but also the occupant or passenger feeling of the ADV may be considered. In order to balance the safety and the occupant or passenger comfort, different stages may be determined based on the status of the ADV. Different actions may be performed based on the different stages. In this technique, the brake unit of the control system may add the braking torque quickly based on the rolling speed of the ADV. For example, the brake unit may hold the ADV on a slope. When the vehicle slips, the primary brake may be used to add the wheel pressure, and a warning message (e.g., Message-1) may be generated. for example, the primary brake may be used to add the wheel pressure below a first predetermined rate threshold based on the status of the ADV (mass, rolling speed) and road conditions (friction, slop gradient). If the ADV continues to slip over with the rolling speed exceeding the low-speed threshold, the electronic parking brake (EPB) may be activated, and a warning message (e.g., Message-2) may be generated. If the primary brake fails, or the EBP fails, the secondary brake may be activated, and a warning message (e.g., Message-3) may be generated. If the ADV becomes to a standstill, the parking may be requested to help to hold the ADV. If all the brakes still cannot hold the ADV from rolling, the engine brake may be used to reduce the crash damage, and a warning message (e.g., Message-4) may be generated.

According to some embodiments, data is received from a plurality of sensors mounted on an ADV being held to a standstill. A status of the ADV including a rolling speed of the ADV is detected based on the data from the plurality of sensors. One of a primary brake or a secondary brake is activated, in response to detecting the status of the ADV being a first status including the rolling speed being higher than zero and lower than a first predetermined speed threshold. An electronic parking brake is activated, in response to detecting the status of the ADV being a second status including the rolling speed being higher than the first predetermined speed threshold and lower than a second predetermined speed threshold.

In one embodiment, the status of the ADV may further include a distance between the ADV and an obstacle. In one embodiment, whether the primary brake is available in response to detecting the rolling speed being higher than zero may be determined. In one embodiment, the primary brake may be activated in response to determining that the primary brake is available. In one embodiment, the primary brake may be activated including applying a wheel pressure below a predetermined rate threshold.

In one embodiment, a secondary brake may be activated, in response to determining the status of the ADV being a third status including the rolling speed being higher than the second predetermined speed threshold and lower than a third predetermined speed threshold. In one embodiment, an engine brake may be activated, in response to determining the status of the ADV being a fourth status including the rolling speed being higher than the third predetermined speed threshold.

In one embodiment, a parking may be activated, in response to determining the rolling speed being zero. In one embodiment, the secondary brake may be activated in response to determining that the primary brake is not available. In one embodiment, the secondary brake may be activated including applying a wheel pressure below a predetermined rate threshold.

In one embodiment, an engine brake may be activated, in response to determining the rolling speed being higher than the second predetermined speed threshold.

In one embodiment, a first warning message may be generated with a first level of warning in response to in response to detecting the status of the ADV being the first status. In one embodiment, a second warning message may be generated with a second level of warning in response to in response to detecting the status of the ADV being the second status, where the second level of warning is higher than the first level of warning.

In one embodiment, a third warning message may be generated with a third level of warning in response to in response to detecting the status of the ADV being a third status including the rolling speed being higher than the second predetermined speed threshold and lower than a third predetermined speed threshold, where the third level of warning is higher than the second level of warning.

In one embodiment, a fourth warning message may be generated with a fourth level of warning in response to in response to detecting the status of the ADV being a fourth status including the rolling speed being higher than the third predetermined speed threshold, where the fourth level of warning is higher than the third level of warning.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
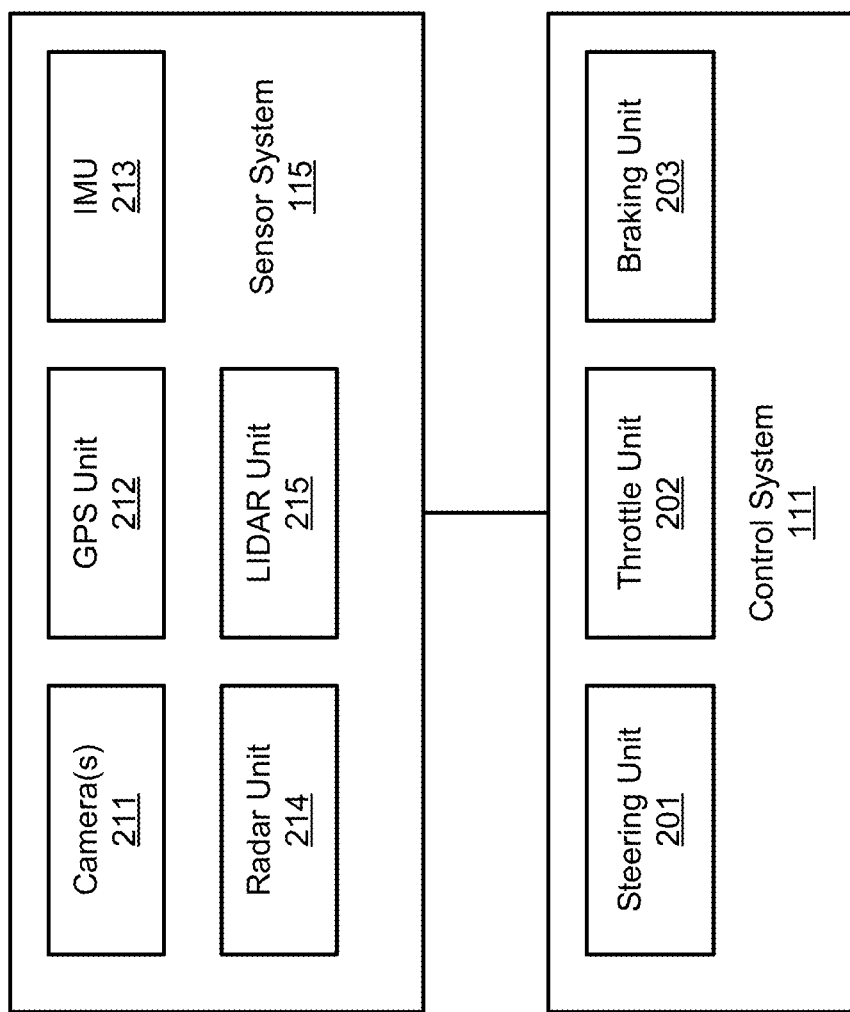
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. The details of the braking unit 203 will be discussed below. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to receive data from a plurality of sensors mounted on the ADV being held to a standstill, an algorithm to detect a status of the ADV including a rolling speed of the ADV based on the data from the plurality of sensors, an algorithm to activate one of a primary brake or a secondary brake, in response to detecting the status of the ADV being a first status including the rolling speed being higher than zero and lower than a first predetermined speed threshold, and/or an algorithm to activate an electronic parking brake, in response to detecting the status of the ADV being a second status including the rolling speed being higher than the first predetermined speed threshold and lower than a second predetermined speed threshold. Algorithms 124 can then be uploaded on ADVs to be utilized during autonomous driving in real-time.

Figure 3A:
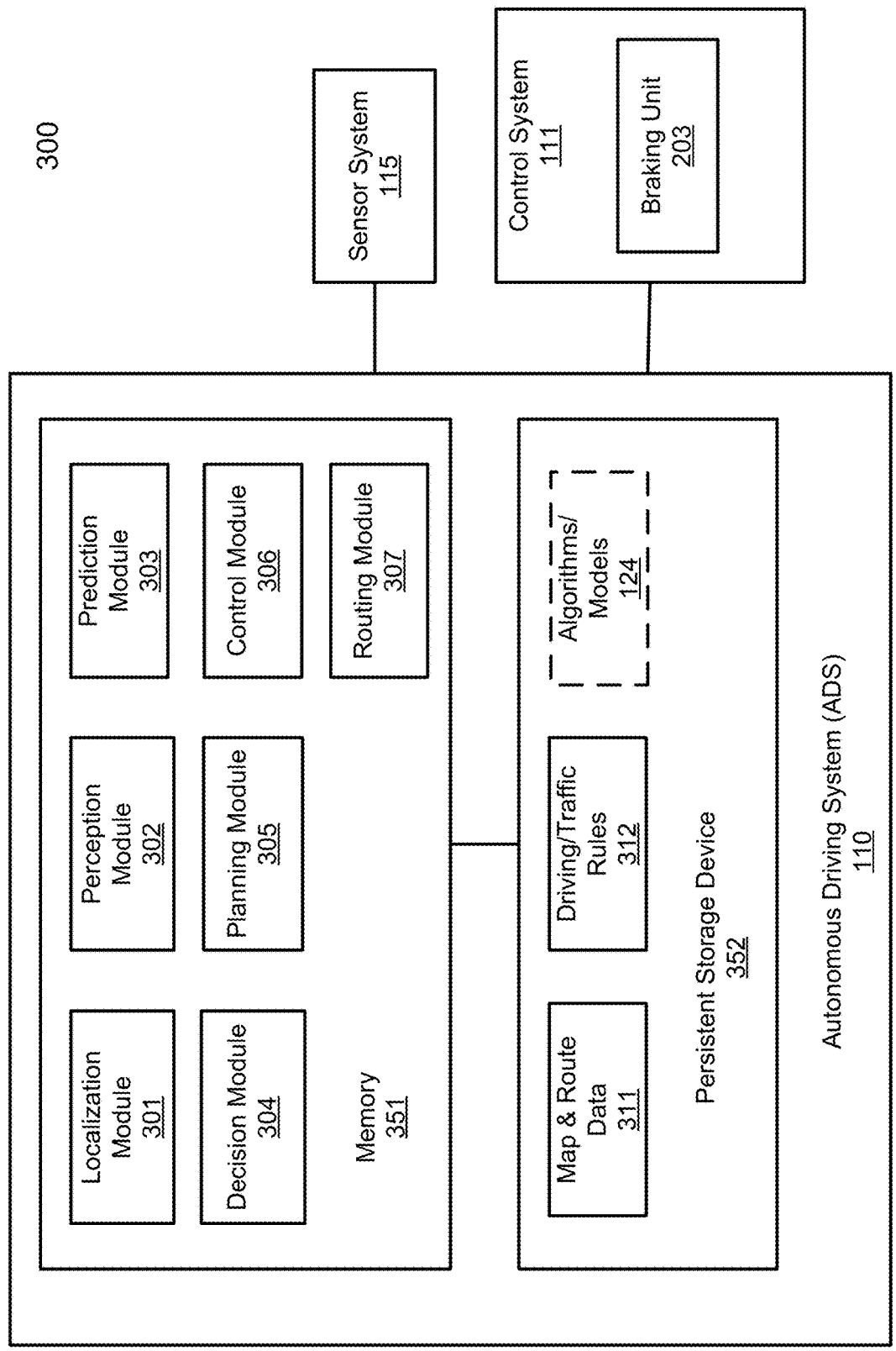
FIGS. 3A-3B are block diagrams illustrating an example of an autonomous driving system used with an autonomous driving vehicle according to one embodiment.
Figure 3B:
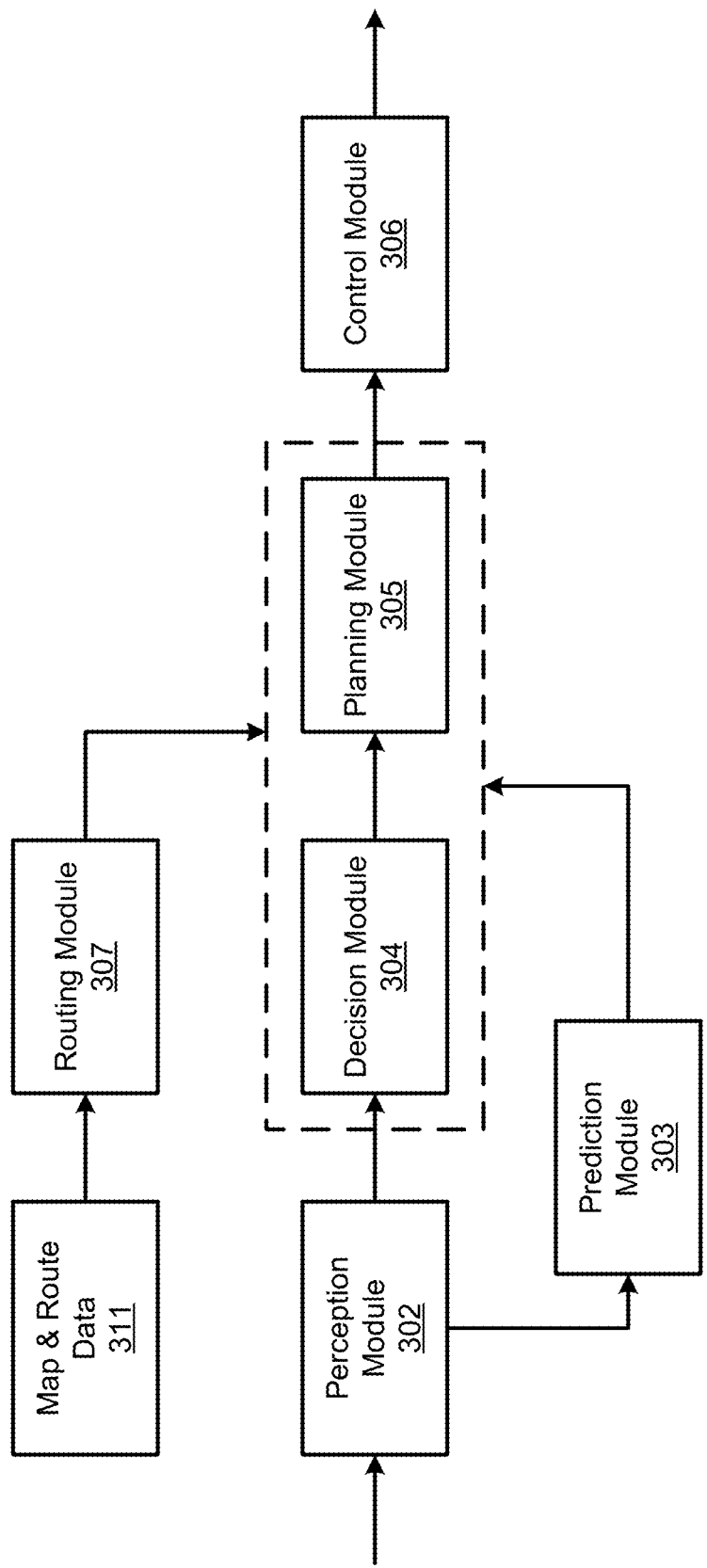

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4A:
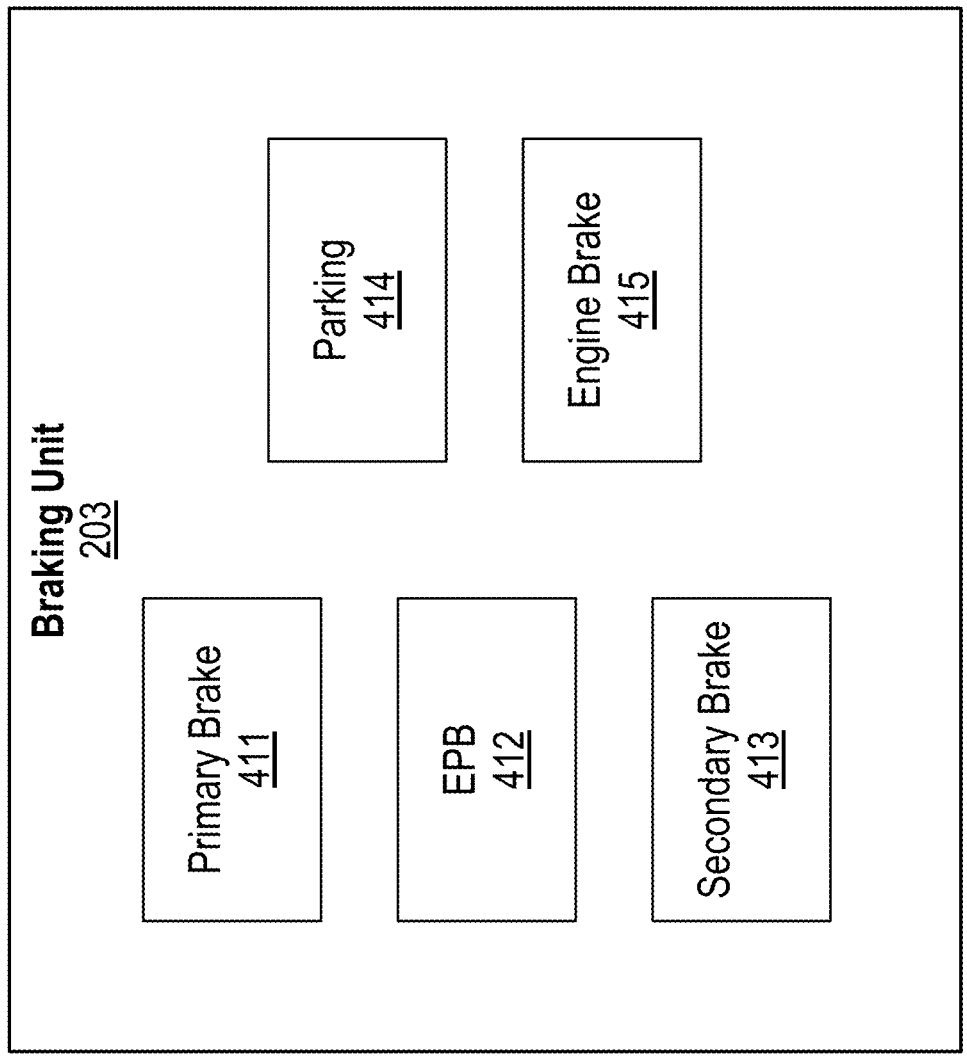
FIGS. 4A-4B are block diagrams illustrating an example of a braking unit of a control system of an autonomous driving vehicle according to one embodiment.
Figure 4B:
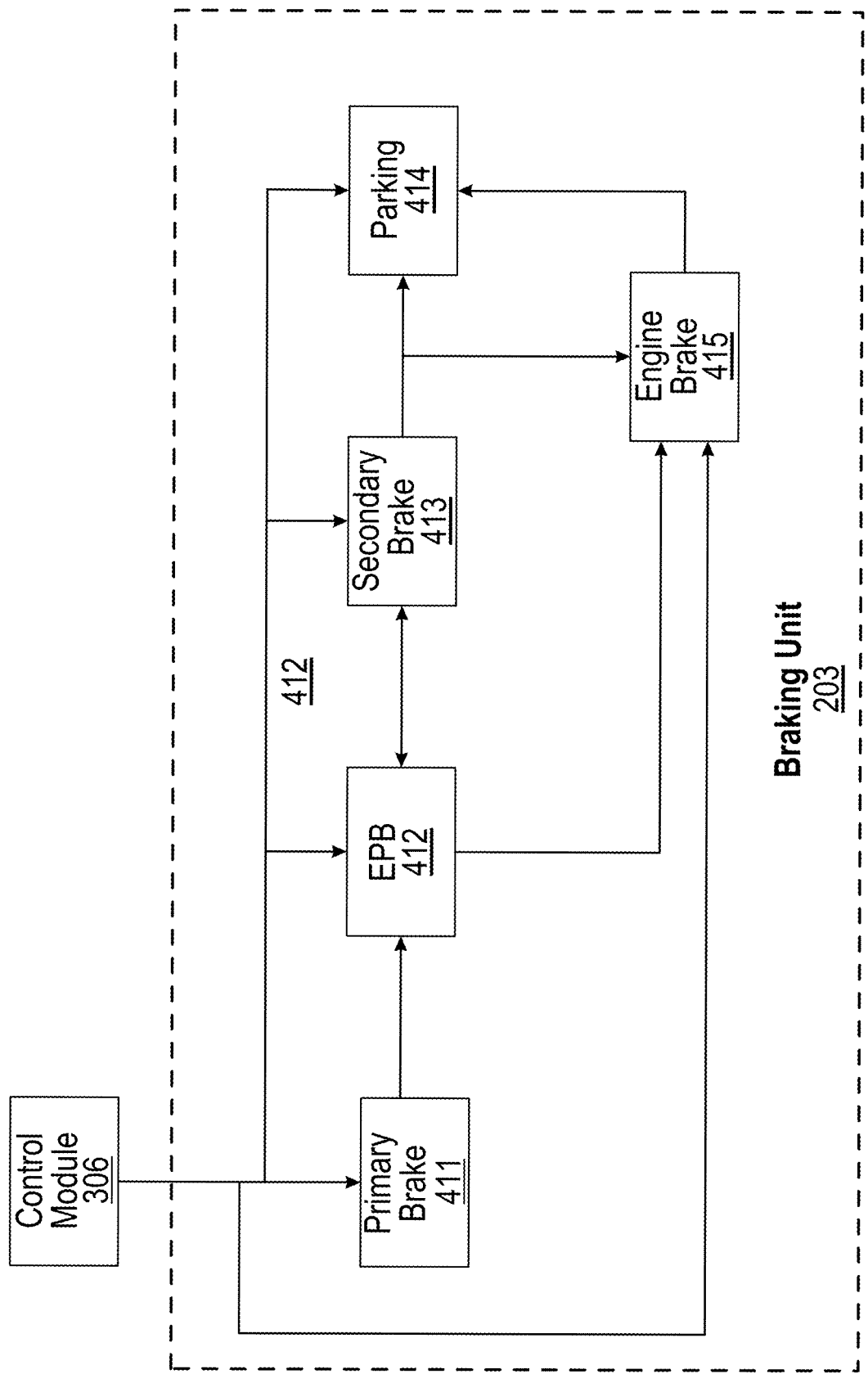

FIGS. 4A-4B are block diagrams illustrating an example of a braking unit of a control system of an autonomous driving vehicle according to one embodiment. Referring to FIG. 4A, braking unit 203 includes, but is not limited to, primary brake 411, EPB 412, secondary brake 413, parking 414, and/or engine brake 415. Some or all of brakes 411-415 may be implemented in hardware, software or a combination thereof. Note that some or all of the brakes 411-415 may be communicatively coupled to or integrated with some or all of other units of vehicle control system 111 in FIG. 2.

The primary brake 411 may control the speed of the ADV, stop the ADV, or hold the ADV to a standstill (remain stationary). The primary brake 411 may be the rear brakes, which may be used as the first defense to prevent the ADV from rolling. The primary brake 411 may be held safely, however, have the limitation of timeout. The EPB 412 may be activated with a button (instead of a lever) and the brake pads may be electrically applied to the wheels of the ADV. However, the speed of EPB 412 may be slow. The EPB may also have noise issues. The secondary brake 413 may be for use in the event of failure of the primary brake 411. The secondary brake 413 may be the front brakes, often pressure restricted in order to prevent the front wheels lockup and subsequent loss of steering. The secondary brake 413 may not be able to hold a big pressure for a time period exceeding a threshold, for example, 10 second. The secondary brake 413 may have noise issues. The parking 414 may keep a parked vehicle stationary, and the parking 414 may prevent the ADV from rolling down a hill or moving while in a standstill. However, it is not safe for the parking 414 to hold too much weight. The ADV cannot drive with the parking on, which may cause damage to the braking unit. The ADV may need to shift from the status of "parking", in which the parking is on, to the status of "drive", in which in which the parking is off, in order to drive. However, the shifting mechanism is complex. The engine brake 415 may only reduce the speed of the ADV. The engine brake 415 may be used at the last defense when all other brakes have failed.

Referring to FIG. 4B, the braking unit may be configured to perform a redundant holding control to balance the safety and the occupant or passenger comfort of the ADV. For example, the brake unit may be configured to hold the ADV on a slope. Different actions may be performed based on the vehicle status of the ADV. The control module 306 controls and drives the ADV, by sending proper commands or signals to vehicle control system 111 including the braking unit 203. The control module 306 and the brake unit 203 may perform the redundant holding control.

In one embodiment, when the ADV slips, the primary brake 411 may be used to add the wheel pressure, and a warning message (e.g., Message-1) may be generated. For example, the primary brake 411 may be used to add the wheel pressure below a first predetermined rate threshold based on the status of the ADV being in a first status and/or road conditions. For example, the status of the AVD may include a rolling speed of the ADV. The status of the AVD may include a distance between the ADV and an obstacle, for example, which may be the closest obstacle behind when the ADV is rolling back or the closest obstacle ahead of the ADV when the ADV is rolling forward. The status of the AVD may include a mass of the ADV, for example. The road condition may include the friction of the road, the slope gradient of the road, etc.

In one embodiment, the first status may include the rolling speed of the ADV being higher than zero and lower than a first predetermined speed threshold. For example, the first predetermined speed threshold V1 may be 0.1, 0.2, 0.5, or 1 kilometers per hour (kph) or any values therebetween. In one embodiment, the first status may include the distance between the ADV and the obstacle being larger than a first predetermined distance threshold. In one embodiment, the first status may include the mass of the ADV being less than a first predetermined mass threshold. In one embodiment, the first status may include the rolling speed of the ADV being higher than zero and lower than a first predetermined speed threshold, the distance between the ADV and the obstacle larger than the first predetermined distance threshold, and/or the mass of the ADV being less than the first predetermined mass threshold. The primary brake 411 may be used to add the wheel pressure slowly below a first predetermined rate threshold to consider the comfort and feeling of the occupant.

If the ADV continues to slip over with the status of the ADV being a second status, the EPB 412 may be activated, and a warning message (e.g., Message-2) may be generated. In one embodiment, the second status may include the rolling speed of the ADV being higher than the first predetermined speed threshold and lower than a second predetermined speed threshold, the distance between the ADV and the obstacle less than the first predetermined distance threshold and larger than a second predetermined distance threshold.

If the primary brake 411 fails or the EBP 412 fails, the secondary brake 413 may be activated with the status of the ADV being a third status, and a warning message (e.g., Message-3) may be generated. In one embodiment, the third status may include the rolling speed of the ADV being higher than the second predetermined speed threshold and lower than a third predetermined speed threshold, the distance between the ADV and the obstacle less than the second predetermined distance threshold and larger than a third predetermined distance threshold.

If the ADV becomes to a standstill, the parking 414 may be requested to help to hold the ADV. If all the brakes still cannot hold the ADV from rolling and the ADV is in a fourth status, the engine brake 415 may be used to reduce the crash damage, and a warning message (e.g., Message-4) may be generated. In one embodiment, the fourth status may include the rolling speed of the ADV being higher than the third predetermined speed threshold, the distance between the ADV and the obstacle less than the third predetermined distance threshold.

In another embodiment, the primary brake 411 may not be available. For example, the primary brake 411 may have problems. The secondary brake 413 may be activated, for example, the secondary brake 413 may be used to add the wheel pressure below a second predetermined rate threshold based on the status of the ADV and road conditions. If the ADV continues to slip over, the EPB 412 may be activated, for example when the rolling speed of the ADV exceeding the first predetermined speed threshold. If all the brakes still cannot hold the ADV from rolling, the engine brake 415 may be used to reduce the crash damage.

Figure 5:
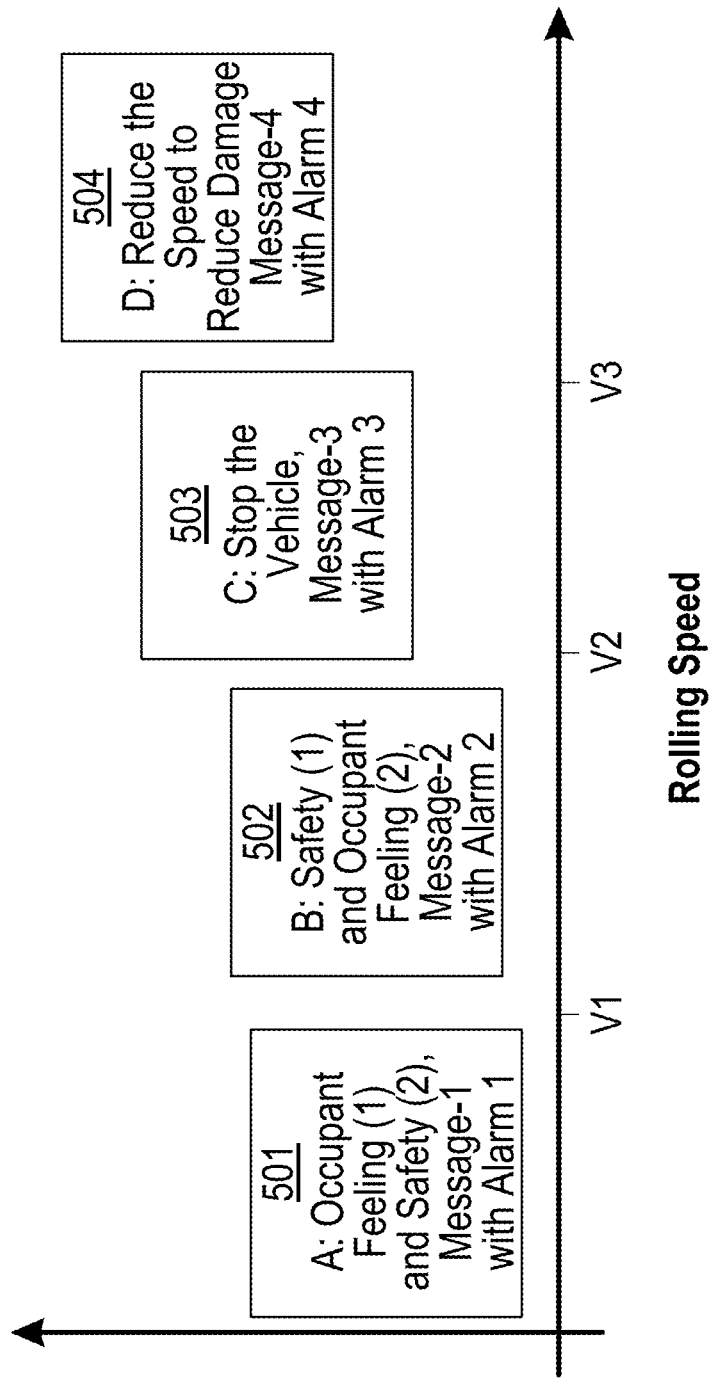
FIG. 5 is a diagram illustrating an example of a redundant holding control based on a status of an autonomous driving vehicle according to one embodiment.

FIG. 5 is a diagram illustrating an example of a redundant holding control based on a status of an autonomous driving vehicle according to one embodiment. By using the redundant holding control, not only the safety but also the comfort of the occupant or passenger of the ADV may be considered. In order to balance the safety and the occupant or passenger comfort, different stages of the redundant holding control may be determined based on the status of the ADV. Different actions may be performed based on the different stages.

Referring to FIG. 5, for example, the status of the ADV may be determined based on the rolling spend of the ADV. When initially detecting that the ADV is rolling, e.g., with the rolling speed higher than zero and lower than the first predetermined speed threshold V1, the status of the ADV may be determined to be in the first status. The redundant holding control may be in a first stage 501 based on the first status of the ADV. In the first stage 501, the occupant feeling may be considered at first, and the safety may be considered at second. The primary brake may be used to add the wheel pressure slowly, below the first predetermined rate threshold, and the warning message (e.g., Message-1) may be generated with a first level of warning. For example, the first level of warning may be slow flashing lights.

If the ADV continues to slip over with the rolling speed exceeding the first predetermined speed threshold V1 but lower than the second predetermined spend threshold V2, the status of the ADV may be determined to be in the second status. The redundant holding control may be in a second stage 502 based on the second status of the ADV. In the second stage 502, the safety may be considered at first, and the occupant feeling may be considered at second. The EPB may be activated, and a warning message (e.g., Message-2) may be generated with a second level of warning. For example, the second level of warning may be rapid flashing lights. The second level of warning may be higher than the first level of warning.

If the primary brake fails, or the EBP fails, the ADV continues to slip over with the rolling speed exceeding the second predetermined threshold V2 but lower than a third predetermined threshold V3, the status of the ADV may be determined to be in the third status. The redundant holding control may be in a third stage 503 based on the third status of the ADV. In the third stage 503, it is important to stop the ADV, and safety is considered. Thus, the secondary brake may be activated, and a warning message (e.g., Message-3) may be generated with a third level of warning. For example, the third level of warning may be sounds and fast flashing lights. The third level of warning may be higher than the second level of warning.

If the ADV becomes to a standstill, the parking may be requested to help to hold the ADV. If all the brakes still cannot hold the ADV from rolling, the ADV continues to roll back with the rolling speed exceeding the third predetermined threshold V3, the status of the ADV may be determined to be in the fourth status. The redundant holding control may be in a fourth stage 504 based on the fourth status of the ADV. In the fourth stage 504, it is important to reduce the speed of the ADV to reduce the crash damage since the ADV may be about to crash into an obstacle. Thus, the engine brake may be activated to reduce the crash damage, and a warning message (e.g., Message-4) may be generated with a fourth level of warning. For example, the fourth level of warning may be loud alarm sound and rapidly flashing lights. The fourth level of warning may be higher than the third level of warning.

Figure 6A:
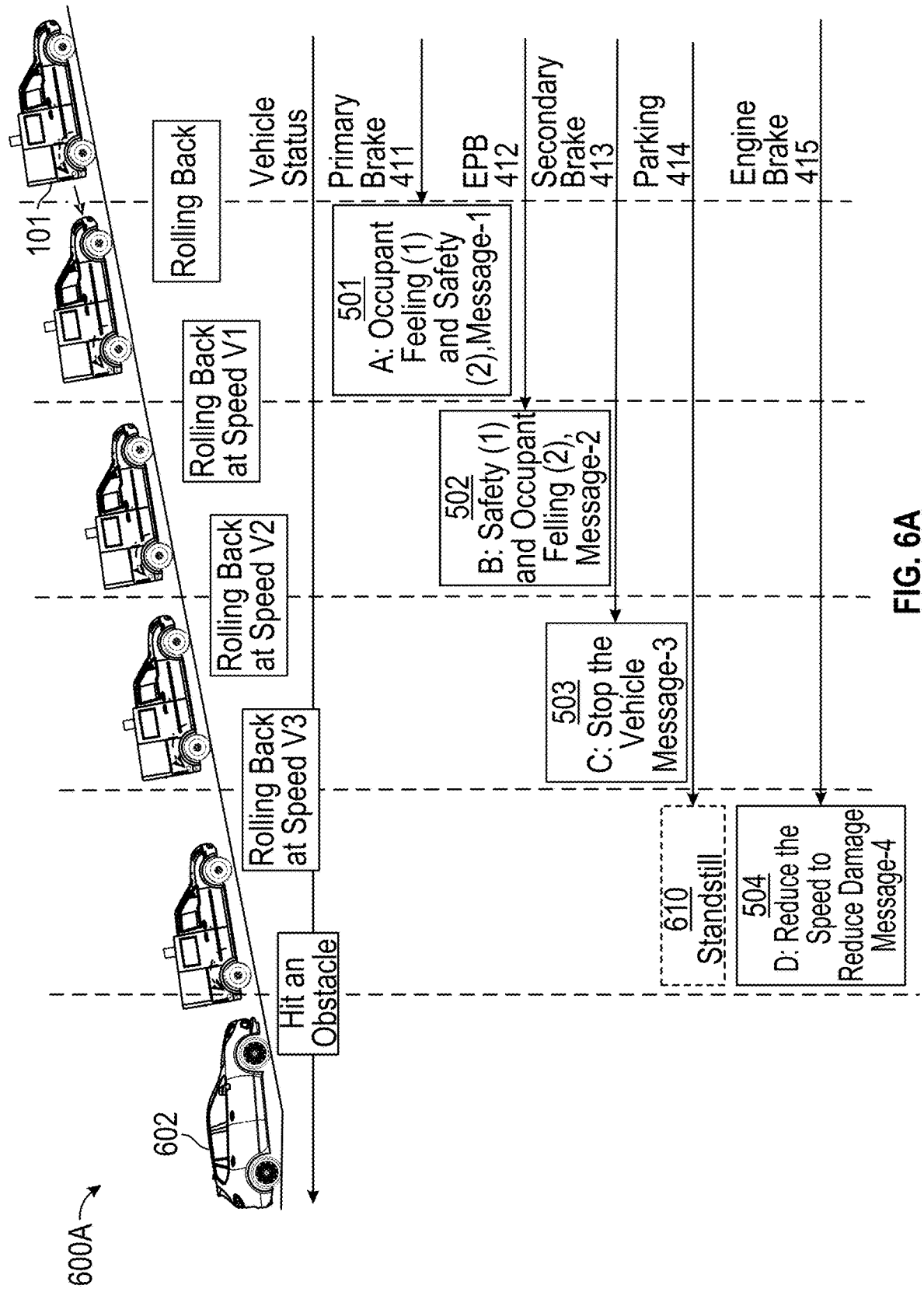
FIG. 6A is a diagram illustrating an example of a redundant holding control to prevent rolling of an autonomous driving vehicle according to one embodiment.

FIG. 6A is a diagram 600A illustrating an example of a redundant holding control to prevent rolling of the autonomous driving vehicle 101 according to one embodiment. In the redundant holding control, not only the safety but also the comfort of the occupant or passenger of the ADV may be considered. In order to balance the safety and the occupant or passenger comfort, different holding control actions by different brakes may be performed at different stages based on the status of the ADV 101.

Referring to FIG. 6A, the ADV 101 may be supposed to be hold to a standstill. Initially, the sensors of the ADV 101 may detect that the ADV 101 is rolling back in the first status, e.g., with the rolling speed higher than zero and lower than the first predetermined speed threshold V1, and/or an obstacle 602 is at a distance larger than the first predetermined distance threshold. For example, the first predetermined speed threshold V1 may be 0.1, 0.2, 0.5, or 1 kilometers per hour (kph) or any values therebetween. The predetermined distance threshold may be 5, 10, 15, 20 meters or any values therebetween. Based on the first status of the ADV 101, the redundant holding control may be in the first stage 501, in which the occupant feeling may be considered at first, and the safety may be considered at second. The primary brake 411 may be used to add the wheel pressure slowly, for example, below a first predetermined rate threshold R1 (Nm/s, Mpa/s). The control system of the ADV may generate a first warning message (e.g., Message-1), for example, with slow flashing lights.

If the ADV 101 continues to roll back with the rolling speed exceeding the first predetermined speed threshold V1 but lower than the second predetermined speed threshold V2, the status of the ADV may be changed to be in the second status. Based on the second status of the ADV 101, the redundant holding control may be in the second stage 502, in which the safety may have the priority over the occupant feeling. For example, the second predetermined speed threshold may be 1, 1.5, or 2 kph or any values therebetween. The EPB 412 may be activated to try to hold the ADV 101. The control system of the ADV may generate a second warning message (e.g., Message-2), for example, with fast flashing lights.

If the primary brake or the EBP fails, the ADV 101 still continues to roll back with the rolling speed exceeding the second predetermined threshold V2 but lower than the third predetermined threshold V3, the status of the ADV may be changed to be in the third status. Based on the third status of the ADV 101, the redundant holding control may be in the third stage 503, in which the secondary brake 413 may be activated to try to quickly stop the ADV 101 since the situation may be dangerous. For example, the second predetermined speed threshold may be 2, 3, 4, or 5 kph or any values therebetween. The control system of the ADV may generate a third warning message (e.g., Message-3), for example, with loud voice and rapid flashing lights. If the ADV 101 becomes to a standstill, the parking 414 may be activated to hold the ADV, as illustrated in 610.

If all the brakes still cannot hold the ADV 101 from rolling, the ADV 101 continues to roll back with the rolling speed exceeding the third predetermined threshold V3. The ADV 101 may be close to the obstacle 602 and about to hit the obstacle 602, e.g., the obstacle behind. The status of the ADV may be changed to be in the fourth status. Based on the fourth status of the ADV 101, the redundant holding control may be in the fourth stage 504, in which, in which the engine brake 415 may be activated to reduce the crash damage. The control system of the ADV may generate a fourth warning message (e.g., Message-4), for example, with alarming sound and rapidly flashing lights.

Figure 6B:
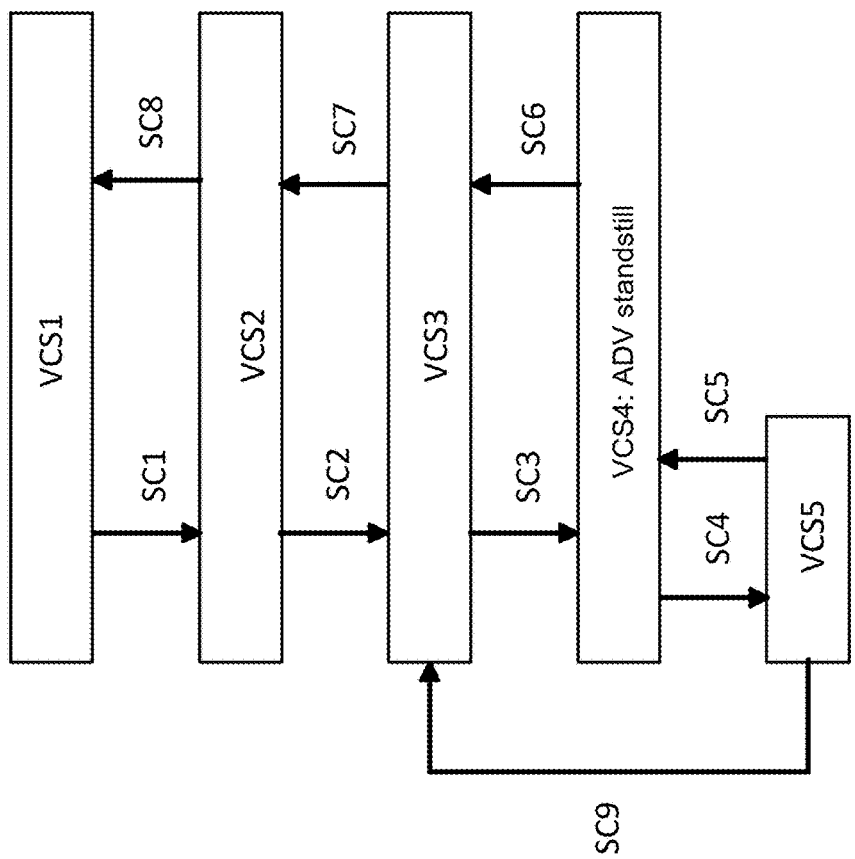
FIG. 6B illustrate a state diagram of an autonomous driving vehicle using a redundant holding control according to one embodiment.

FIG. 6B illustrate a state diagram 600B of an autonomous driving vehicle using a redundant holding control according to one embodiment. The wheel sensors may be used to detect a very low speed of the ADV when the ADV initially starts rolling. The wheel sensors may generate magnetic pulses in the form of waves, proportional to the speed of the ADV. The ADV may be in different states based on the speed of the ADV, and different holding control techniques may be applied accordingly.

Referring to FIG. 6B, the ADV 101 may be supposed to be hold to a standstill at a state VCS4. Four wheel-sensors located at four wheels (front left (FL), front right (FR), rear left (RL), rear right (RR) wheel) may be used to detect the rolling speed of the ADV based on pulses detected. When at least two of diagonal wheel-sensors (FL&RR or FR&RL) may detect pulses within a first time period, a trigger SC4 may happen, in which the ADV may change to the state VCS5 in which the ADV is rolling. For example, the first time period may be 250 ms, 350 ms, 450 ms, 550 ms, 650 ms, or any values there between. A trigger SC6 from the state VCS4 to a state VCS3 may not be allowed.

While in the state VCS5, when no wheel-sensors may detect any pulses for a second period of time, a trigger SC5 may happen, in which the ADV may change back to the state VCS4; when the rolling speed is larger than a first speed (e.g., 0.5, 1, or 1.5 kph), a trigger SC9 may happen, in which the state of the ADV may change to the state VCS3. For example, the second time period may be 50 ms, 150 ms, 250 ms, 350 ms, 450 ms, or any values there between.

While in the state VCS3, when no wheel-sensors may detect any pulses for the second period of time, a trigger SC3 may happen, in which the ADV may change back to the state VCS4; when the rolling speed is larger than a second speed (e.g., 1.5, 2, or 2.5 kph), a trigger SC7 may happen, in which the state of the ADV may change to a state VCS2.

While in the state VCS2, when the rolling speed is less than the second speed (e.g., 1.5, 2, or 2.5 kph), a trigger SC2 may happen, in which the ADV may change back to the state VCS3; when the rolling speed is larger than a third speed (e.g., 5, 6, 7, 8, 9, or 10 kph), a trigger SC8 may happen, in which the state of the ADV may change to a state VCS1. While in the state VCS1, when the rolling speed is less than a fourth speed (e.g., 2, 3, or 4 kph), a trigger SC1 may happen, in which the ADV may change back to the state VCS2.

Different brakes may be activated based on different states of the ADV. For example, when the ADV is at the state VSC5, the redundant holding control may be in the first stage 501, and the primary brake 411 may be used. When the ADV is at the state VSC3, the redundant holding control may be in the second stage 502, and the EPB 412 may be activated. When the ADV is at the state VSC2, the redundant holding control may be in the third stage 503, in which the secondary brake 413 may be activated. When the ADV is at the state VSC1, the redundant holding control may be in the fourth stage 504, and the engine brake 415 may be activated.

Figure 7A:
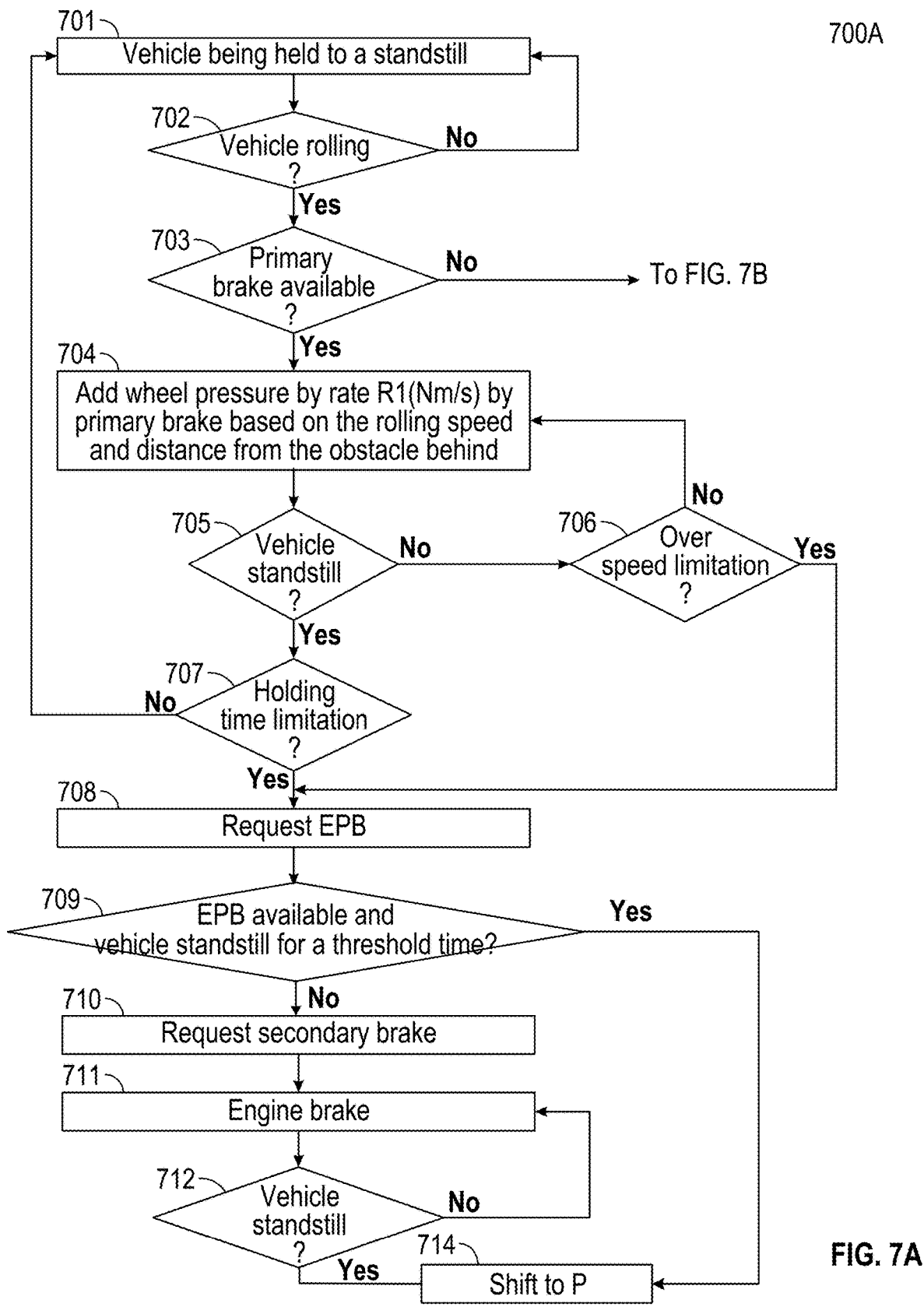
FIGS. 7A-7B are flow diagrams illustrating an example of using a redundant holding control of an autonomous driving vehicle according to one embodiment.
Figure 7B:
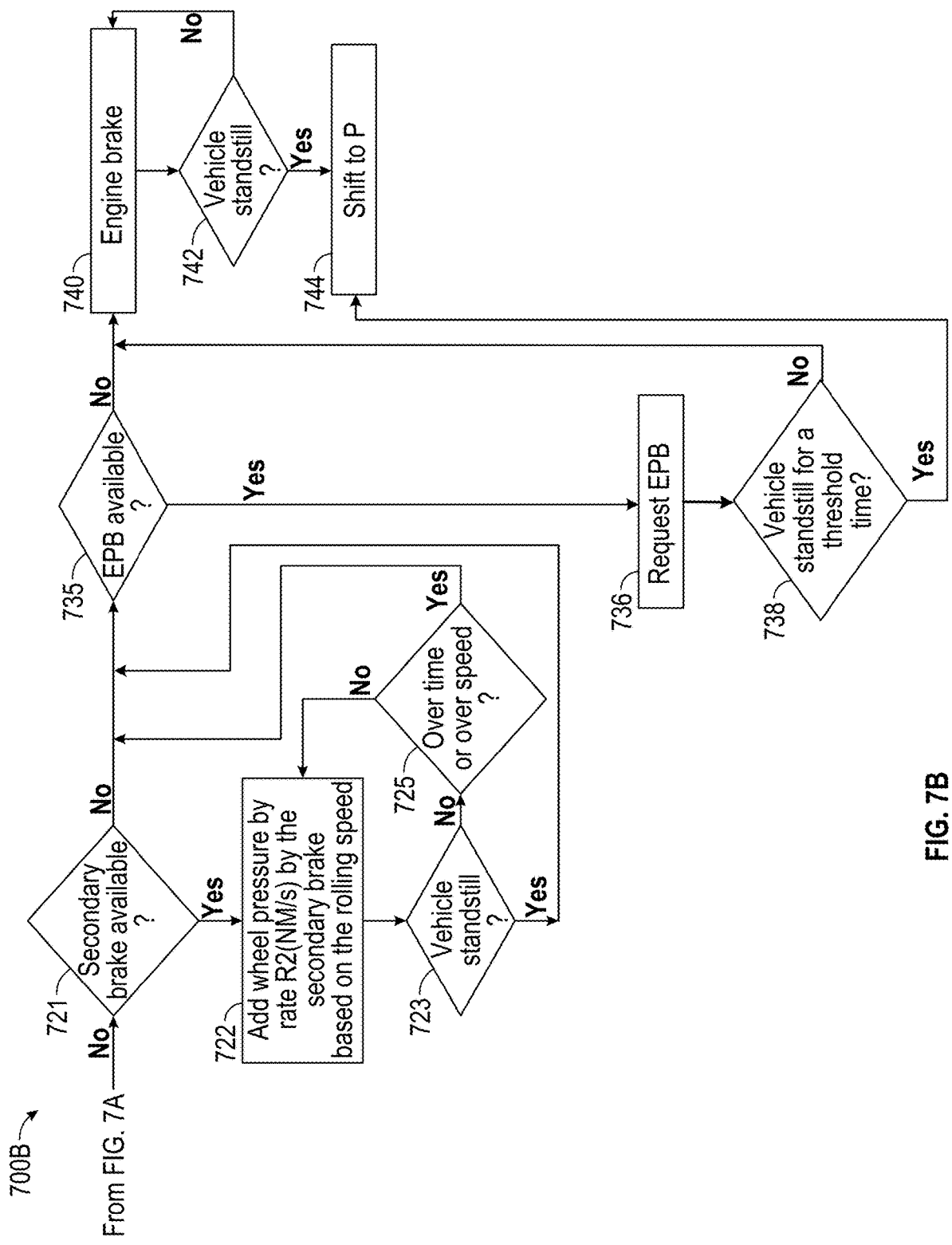

FIGS. 7A-7B are flow diagrams illustrating an example of using a redundant holding control of an autonomous driving vehicle according to one embodiment. By using the redundant holding control, both the safety and the comfort of the passenger of the ADV may be considered.

Referring to FIG. 7A, at block 701, the ADV 101 may be supposed to be hold to a standstill. At block 702, the sensors of the ADV 101 may detect the rolling speed of the ADV to determine if the ADV is rolling. At block 703, if the sensors may detect the ADV is rolling, whether the primary brake is available may be determined.

At block 704, when the primary brake is available, the primary brake may be used to add the wheel pressure slowly, for example, below the first predetermined rate threshold R1 (Nm/s) based on the rolling speed lower than the first predetermined speed threshold V1 and/or the distance from the closest obstacle behind larger the first predetermined distance threshold. The situation when the primary brake is not available will be discussed in FIG. 7B.

At block 705, whether the ADV is in a standstill may be determined. At block 706, if the ADV is not in the standstill, whether the rolling speed is larger than the first predetermined speed threshold V1 may be determined. At block 707, if the ADV is in the standstill, whether the holding time limitation of the primary brake is reached may be determined.

At block 708, if the rolling speed exceeding the first predetermined speed threshold V1 or the holding time limitation of the primary brake is reached, the EPB may be requested or activated to hold the ADV.

At block 709, whether the EPB is available and the ADV is in a standstill for a predetermined threshold time may be determined. For example, the predetermined threshold time may be 1, 2, 3, 4, 5, 10 minutes for any values therebetween. If the EPB is available (e.g., being activated) and the ADV is in the standstill for the predetermined threshold time, the parking may be activated by shifting to "park", as illustrated in block 714.

At block 710, if the ADV is not in the standstill for the predetermined threshold time, for example, the ADV still continues to roll, the secondary brake may be requested and/or activated to stop the ADV.

At block 711, if all the above brakes still cannot hold the ADV from rolling, the engine brake may be activated/used to reduce the crash damage. At block 712, whether the ADV is in the standstill may be determined. At block 714, if the ADV is in the standstill, the parking may be activated by shifting to "park".

Referring to FIG. 7B, at block 721, in the situation when the primary brake is not available, whether the secondary brake is available may be determined. At block 722, when the secondary brake is available, the secondary brake may be activated/used to add the wheel pressure below the second predetermined rate threshold R2 (Nm/s) based on the rolling speed lower than the first predetermined speed threshold V1 and/or the distance from the closest obstacle behind larger the first predetermined distance threshold. As discussed above in connection with FIG. 6A, the first predetermined speed threshold V1 may be 0.1, 0.2, 0.5, or 1 kilometers per hour (kph) or any values therebetween.

At block 723, whether the ADV is in the standstill may be determined. If the ADV is in the standstill, the ADV may determine whether the EPB is available, as illustrated at block 735. If the ADV is not in the standstill, whether the rolling speed exceeding the first predetermined speed threshold V1 or the holding time limitation of the secondary brake is reached may be determined, as illustrated at block 725. If the rolling speed does not exceed the first predetermined speed threshold V1 and the holding time limitation of the secondary brake is not reached, the ADV may go back to the operation at block 722 by adding the wheel pressure below the second predetermined rate threshold. If the rolling speed exceeds the first predetermined speed threshold V1 or the holding time limitation of the secondary brake is reached, the ADV may determine whether the EPB is available, as illustrated at block 735.

At block 736, if the EPB is available, the EPB may be requested or activated. At block 738, whether the ADV is in a standstill for a predetermined threshold time may be determined. For example, the predetermined threshold time may be 1, 2, 3, 4, 5, 10 minutes for any values therebetween. If the ADV is in the standstill for the predetermined threshold time, the parking may be activated by shifting to "park", as illustrated in block 744.

At block 740, if the ADV is not in the standstill for the predetermined threshold time (e.g., the EPB still cannot hold the ADV) or the EPB is not available, the engine brake may be activated to reduce the crash damage. At block 742, whether the ADV is in the standstill may be determined. If the ADV is not in the standstill, the engine brake may be continued to be activated. At block 744, if the ADV is in the standstill, the parking may be activated by shifting to "park".

Figure 8:
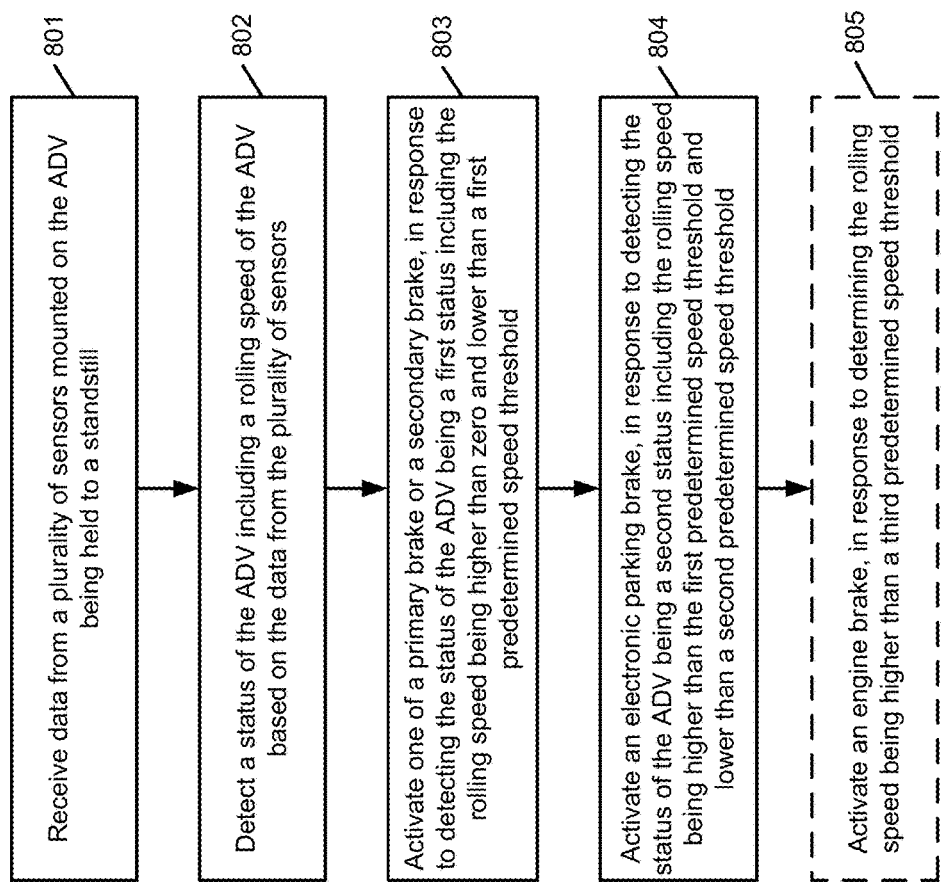
FIG. 8 is a flow diagram illustrating an example of a process of performing a redundant holding control to prevent rolling of an autonomous driving vehicle according to one embodiment.

FIG. 8 is a flow diagram illustrating an example of a process 800 of performing a redundant holding control to prevent rolling of an autonomous driving vehicle according to one embodiment. Process 800 may be performed by processing logic which may include software, hardware, or a combination thereof. For example, process 800 may be performed by the control module 306 and the brake unit 203, as illustrated in FIG. 4B. Referring to FIG. 8, in operation 801, processing logic receives data from a plurality of sensors mounted on the ADV being held to a standstill.

In operation 802, processing logic detects a status of the ADV including a rolling speed of the ADV based on the data from the plurality of sensors.

In operation 803, processing logic activates one of a primary brake or a secondary brake, in response to detecting the status of the ADV being a first status including the rolling speed being higher than zero and lower than a first predetermined speed threshold.

In operation 804, processing logic activates an electronic parking brake, in response to detecting the status of the ADV being a second status including the rolling speed being higher than the first predetermined speed threshold and lower than a second predetermined speed threshold.

In one embodiment, processing logic may determine whether the primary brake is available in response to detecting the rolling speed being higher than zero. In one embodiment, processing logic may activate the primary brake in response to determining that the primary brake is available. In one embodiment, processing logic may activate the primary brake including applying a wheel pressure below a predetermined rate threshold. In one embodiment, processing logic may activate the secondary brake, in response to determining the status of the ADV being a third status including the rolling speed being higher than the second predetermined speed threshold and lower than a third predetermined speed threshold. In one embodiment, processing logic may activate an engine brake, in response to determining the status of the ADV being a fourth status including the rolling speed being higher than the third predetermined speed threshold, as illustrated in operation 805. In one embodiment, processing logic may activate a parking, in response to determining the rolling speed being zero.

In one embodiment, processing logic may activate the secondary brake in response to determining that the primary brake is not available. In one embodiment, processing logic may activate the secondary brake including applying a wheel pressure below a predetermined rate threshold. In one embodiment, processing logic may activate an engine brake, in response to determining the rolling speed being higher than the second predetermined speed threshold.

In one embodiment, processing logic may generate a first warning message with a first level of warning in response to in response to detecting the status of the ADV being the first status. In one embodiment, processing logic may generate a second warning message with a second level of warning in response to in response to detecting the status of the ADV being the second status, where the second level of warning is higher than the first level of warning. In one embodiment, processing logic may generate a third warning message with a third level of warning in response to in response to detecting the status of the ADV being a third status including the rolling speed being higher than the second predetermined speed threshold and lower than a third predetermined speed threshold, where the third level of warning is higher than the second level of warning. In one embodiment, processing logic may generate a fourth warning message with a fourth level of warning in response to in response to detecting the status of the ADV being a fourth status including the rolling speed being higher than the third predetermined speed threshold, where the fourth level of warning is higher than the third level of warning.

By this process, both the safety and the comfort of the occupant or passenger of the ADV may be considered. Different actions may be performed according to different stages of the redundant holding control based on the status of the ADV, thereby balancing the safety and the comfort of the occupant or passenger of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), comprising:
   receiving data from a plurality of sensors mounted on the ADV being held to a standstill;
   detecting a status of the ADV including a rolling speed of the ADV based on the data from the plurality of sensors;
   activating one of a primary brake or a secondary brake, in response to detecting the status of the ADV being a first status including the rolling speed being higher than zero and lower than a first predetermined speed threshold; and
   activating an electronic parking brake, in response to detecting the status of the ADV being a second status including the rolling speed being higher than the first predetermined speed threshold and lower than a second predetermined speed threshold.

2. The method of claim 1, wherein the status of the ADV further includes a distance between the ADV and an obstacle.

3. The method of claim 1, further comprising determining whether the primary brake is available in response to detecting the rolling speed being higher than zero.

4. The method of claim 3, where in the activating one of the primary brake or the secondary brake comprises:
   activating the primary brake in response to determining that the primary brake is available.

5. The method of claim 4, wherein the activating the primary brake comprises:
   activating the primary brake including applying a wheel pressure below a predetermined rate threshold.

6. The method of claim 4, further comprising:
   activating the secondary brake, in response to determining the status of the ADV being a third status including the rolling speed being higher than the second predetermined speed threshold and lower than a third predetermined speed threshold.

7. The method of claim 6, further comprising:
   activating an engine brake, in response to determining the status of the ADV being a fourth status including the rolling speed being higher than the third predetermined speed threshold.

8. The method of claim 6, further comprising:
   activating a parking, in response to determining the rolling speed being zero.

9. The method of claim 3, where in the activating one of the primary brake or the secondary brake comprises:
   activating the secondary brake in response to determining that the primary brake is not available.

10. The method of claim 9, wherein the activating the secondary brake comprises:
    activating the secondary brake including applying a wheel pressure below a predetermined rate threshold.

11. The method of claim 10, further comprising:
    generating a first warning message with a first level of warning in response to in response to detecting the status of the ADV being the first status.

12. The method of claim 11, further comprising:
    generating a second warning message with a second level of warning in response to in response to detecting the status of the ADV being the second status, wherein the second level of warning is higher than the first level of warning.

13. The method of claim 12, further comprising:
    generating a third warning message with a third level of warning in response to in response to detecting the status of the ADV being a third status including the rolling speed being higher than the second predetermined speed threshold and lower than a third predetermined speed threshold, wherein the third level of warning is higher than the second level of warning.

14. The method of claim 13, further comprising:
    generating a fourth warning message with a fourth level of warning in response to in response to detecting the status of the ADV being a fourth status including the rolling speed being higher than the third predetermined speed threshold, wherein the fourth level of warning is higher than the third level of warning.

15. The method of claim 9, further comprising:
    activating an engine brake, in response to determining the rolling speed being higher than the second predetermined speed threshold.

16. A non-transitory machine-readable medium having instructions stored therein, which when executed by a processor, cause the processor to perform operations of operating an autonomous driving vehicle (ADV), the operations comprising:
    receiving data from a plurality of sensors mounted on the ADV being held to a standstill;
    detecting a status of the ADV including a rolling speed of the ADV based on the data from the plurality of sensors;
    activating one of a primary brake or a secondary brake, in response to detecting the status of the ADV being a first status including the rolling speed being higher than zero and lower than a first predetermined speed threshold; and
    activating an electronic parking brake, in response to detecting the status of the ADV being a second status including the rolling speed being higher than the first predetermined speed threshold and lower than a second predetermined speed threshold.

17. The non-transitory machine-readable medium of claim 16, wherein the operations further comprise determining whether the primary brake is available in response to detecting the rolling speed being higher than zero, wherein the activating one of the primary brake or the secondary brake comprises:

activating the primary brake in response to determining that the primary brake is available.

18. The non-transitory machine-readable medium of claim 16, wherein the operations further comprise determining whether the primary brake is available in response to detecting the rolling speed being higher than zero, wherein the activating one of the primary brake or the secondary brake comprises:

activating the secondary brake in response to determining that the primary brake is not available.

19. A data processing system, comprising:

a processor; and a memory coupled to the processor to store instructions, which when executed by the processor, cause the processor to perform operations of operating an autonomous driving vehicle (ADV), the operations including:

receiving data from a plurality of sensors mounted on the ADV being held to a standstill;

detecting a status of the ADV including a rolling speed of the ADV based on the data from the plurality of sensors;

activating one of a primary brake or a secondary brake, in response to detecting the status of the ADV being a first status including the rolling speed being higher than zero and lower than a first predetermined speed threshold; and activating an electronic parking brake, in response to detecting the status of the ADV being a second status including the rolling speed being higher than the first predetermined speed threshold and lower than a second predetermined speed threshold.

20. The data processing system of claim 19, wherein the operations further comprise determining whether the primary brake is available in response to detecting the rolling speed being higher than zero, wherein the activating one of the primary brake or the secondary brake comprises:

activating the primary brake in response to determining that the primary brake is available.

* * * * *